(12) United States Patent
Jung et al.

(10) Patent No.: US 8,633,628 B2
(45) Date of Patent: Jan. 21, 2014

(54) SWITCHED RELUCTANCE MOTOR

(75) Inventors: Sung Tai Jung, Gyunggi-do (KR); Han Kyung Bae, Gyunggi-do (KR); Jung Kyu Yim, Gyunggi-do (KR); Ki Young Lee, Gyunggi-do (KR); Hae Jun Yang, Gyunggi-do (KR); Se Joo Kim, Gyunggi-do (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 0 days.

(21) Appl. No.: 13/339,145

(22) Filed: Dec. 28, 2011

(65) Prior Publication Data

US 2013/0049494 A1  Feb. 28, 2013

(30) Foreign Application Priority Data

Aug. 22, 2011  (KR) .................. 10-2011-0083590

(51) Int. Cl.
*H02K 21/00*  (2006.01)

(52) U.S. Cl.
USPC ........................................................ 310/181

(58) Field of Classification Search
USPC .................... 310/49.06, 181, 21.094, 156.56, 310/154.26, 154.27, 154.34, 49.36, 216.075
See application file for complete search history.

(56) References Cited

U.S. PATENT DOCUMENTS

| | | | |
|---|---|---|---|
| 6,262,508 B1 * | 7/2001 | Shibayama et al. | 310/181 |
| 6,777,842 B2 * | 8/2004 | Horst | 310/154.11 |
| 6,847,143 B1 * | 1/2005 | Akemakou | 310/156.43 |
| 7,898,135 B2 * | 3/2011 | Flynn | 310/152 |
| 2010/0072832 A1 * | 3/2010 | Zhu et al. | 310/49.46 |

* cited by examiner

*Primary Examiner* — Dang Le
(74) *Attorney, Agent, or Firm* — Ladas & Parry, LLP

(57) ABSTRACT

Disclosed herein is a switched reluctance motor including: a salient pole type stator that includes a plurality of teeth having a coil wound therearound and a magnet mounted between the teeth; and a salient pole type rotor that is inserted into a central portion of the stator and rotates, wherein the magnet is mounted between the teeth having the coil wound therearound.

3 Claims, 5 Drawing Sheets

FIG. 6

|  | Q | P |
|---|---|---|
| AVERAGE TORQUE | 0.82Nm | 1.00Nm |

SWITCHED RELUCTANCE MOTOR

CROSS REFERENCE TO RELATED APPLICATION

This application claims the benefit of Korean Patent Application No. 10-2011-0083590, filed on Aug. 22, 2011, entitled "Switched Reluctance Motor", which is hereby incorporated by reference in its entirety into this application.

BACKGROUND OF THE INVENTION

1. Technical Field

The present invention relates to a switched reluctance motor.

2. Description of the Related Art

A general switched reluctance motor (SRM) is a motor in which both of a stator and a rotor have a magnetic structure, which is a salient pole, the stator has a concentrated type coil wound therearound, and the rotor is configured only of an iron core without any type of excitation device (a winding, a permanent magnet, or the like), such that a competitive cost is excellent. A speed changeable switched reluctance motor stably generates a continuous torque with the aid of a converter using a power semiconductor and a sensor sensing a position of a rotor and is easily controlled to be appropriate for performance required in each application.

In the case of various alternate current (AC) motors (an induction motor, a permanent magnet synchronous motor, or the like) and a brushless direct current (DC) motor, when a significant improvement in performance is required with the passage of time after design of one electromagnetic field structure is completed, the electromagnetic field structure should be redesigned as a new electromagnetic field structure. Otherwise, there is no way except for a simple design change replacing a high cost material such as steel, a permanent magnet, or the like, which is not an efficient design. This phenomenon is also applied to a switched reluctance motor.

SUMMARY OF THE INVENTION

The present invention has been made in an effort to provide a switched reluctance motor having a new structure capable of flexibly coping with a request for a significant improvement in performance.

According to a preferred embodiment of the present invention, there is provided a switched reluctance motor including: a salient pole type stator that includes a plurality of teeth having a coil wound therearound and a magnet mounted between the teeth; and a salient pole type rotor that is inserted into a central portion of the stator and rotates, wherein the magnet is mounted between the teeth having the coil wound therearound.

The stator may include a slit part formed at a central portion of the teeth having the magnet mounted therebetween and having a space, and the magnet may be disposed to be spaced apart from the slit part formed in the stator.

A portion of the stator in which the magnet is received, and the slit part may be disposed in a radial direction of the rotor.

The magnet may be a ferrite magnet.

BRIEF DESCRIPTION OF THE DRAWINGS

FIG. 6 is shows the average torque of the switched reluctance motor according to the prior art and the average torque of the switched reluctance motor according to the preferred embodiment of the present invention.

DESCRIPTION OF THE PREFERRED EMBODIMENTS

Figure 1:
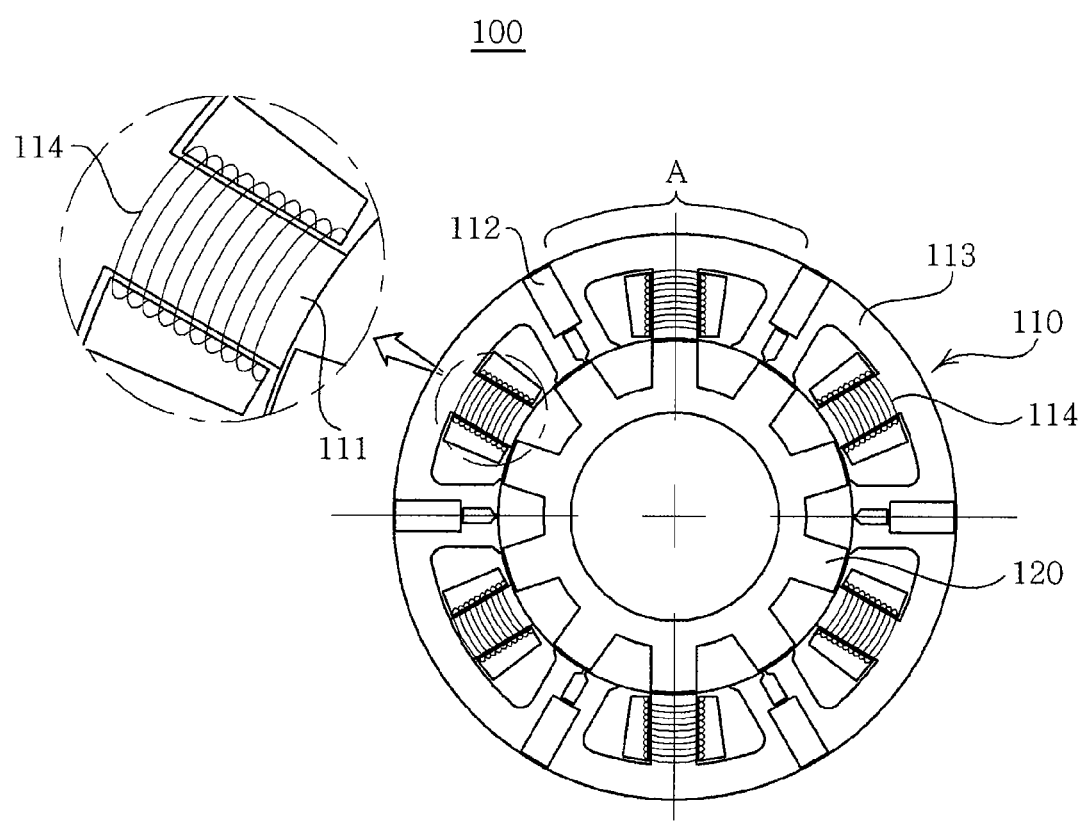
FIG. 1 is a cross-sectional view of a switched reluctance motor according to a preferred embodiment of the present invention.

Various objects, advantages and features of the invention will become apparent from the following description of embodiments with reference to the accompanying drawings.

The terms and words used in the present specification and claims should not be interpreted as being limited to typical meanings or dictionary definitions, but should be interpreted as having meanings and concepts relevant to the technical scope of the present invention based on the rule according to which an inventor can appropriately define the concept of the term to describe most appropriately the best method he or she knows for carrying out the invention.

The above and other objects, features and advantages of the present invention will be more clearly understood from the following detailed description taken in conjunction with the accompanying drawings. In the specification, in adding reference numerals to components throughout the drawings, it is to be noted that like reference numerals designate like components even though components are shown in different drawings. Further, when it is determined that the detailed description of the known art related to the present invention may obscure the gist of the present invention, the detailed description thereof will be omitted.

Hereinafter, preferred embodiments of the present invention will be described in detail with reference to the accompanying drawings.

FIG. 1 is a cross-sectional view of a switched reluctance motor according to a preferred embodiment of the present invention.

Figure 2:
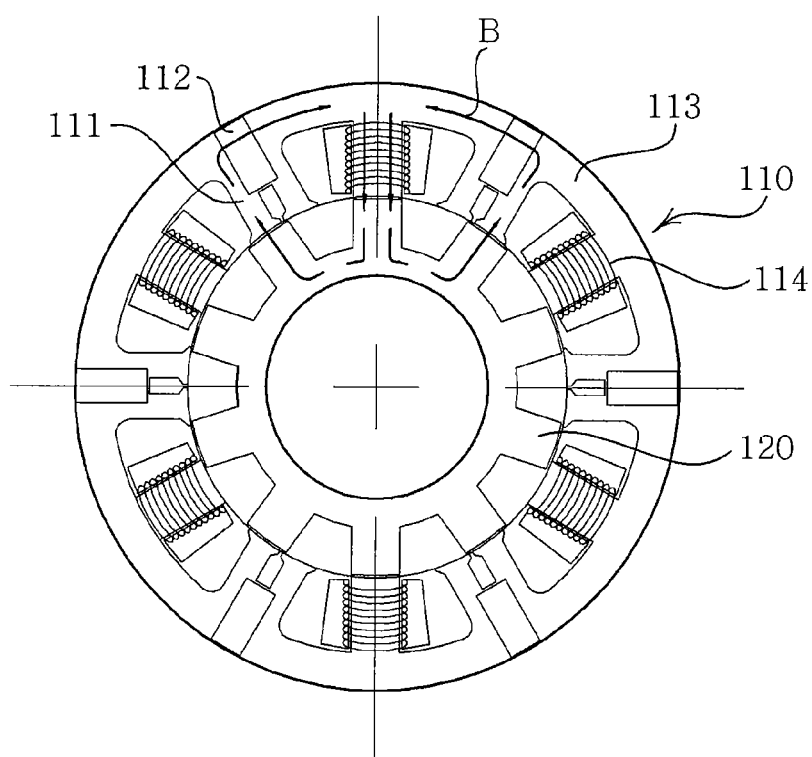
FIG. 2 is a cross-sectional view showing a direction in which a current flows in the switched reluctance motor according to the preferred embodiment of the present invention.

FIG. 2 is a cross-sectional view showing a direction in which a current flows in the switched reluctance motor according to the preferred embodiment of the present invention.

Figure 3:
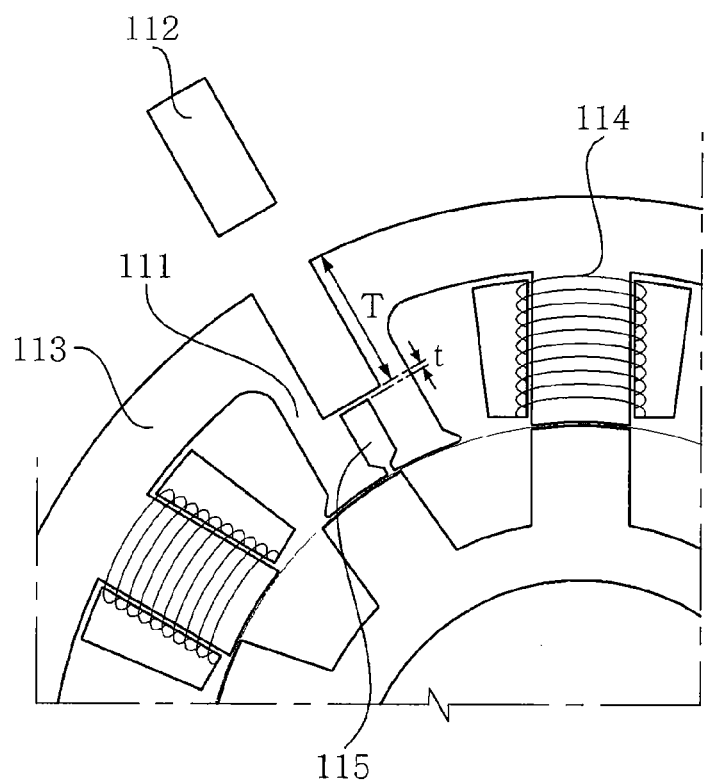
FIGS. 3 and 4 are partially enlarged views of the switched reluctance motor according to the preferred embodiment of the present invention.
Figure 4:
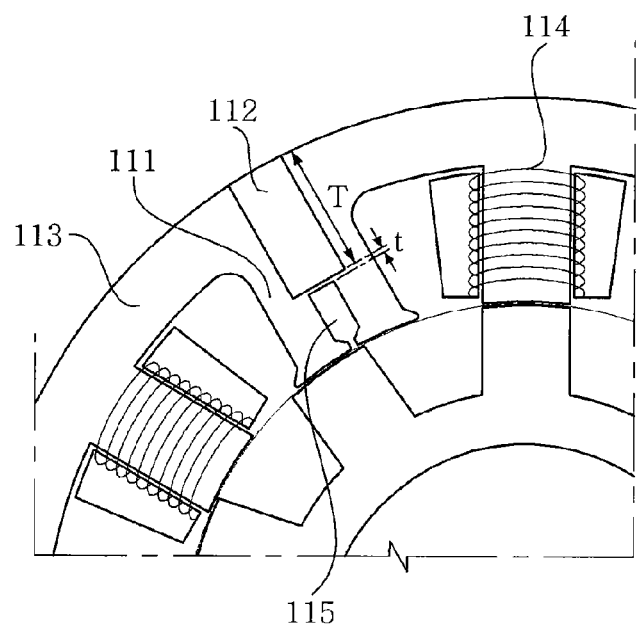

FIGS. 3 and 4 are partially enlarged views of the switched reluctance motor according to the preferred embodiment of the present invention.

Figure 5:
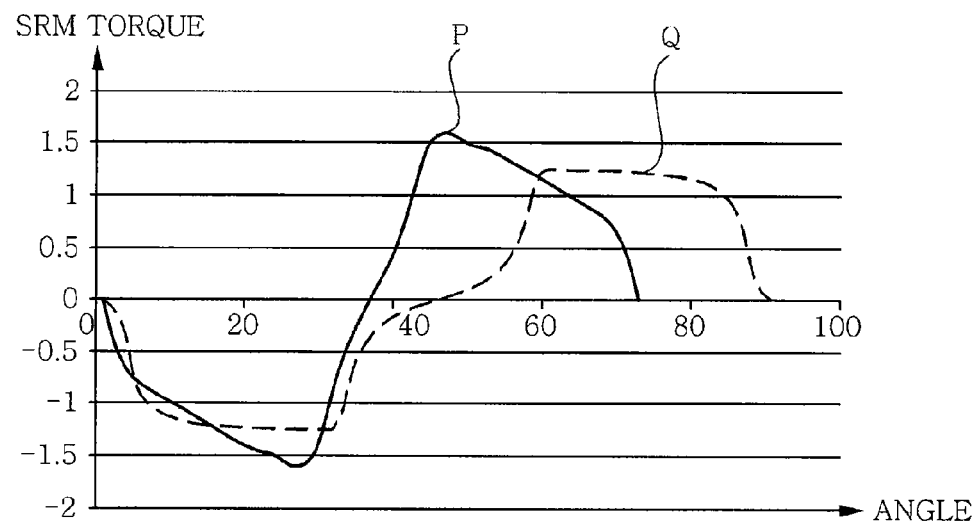
FIG. 5 is a graphs showing a change in a SRM torque according to an angle of the switched reluctance motor according to the prior art and the preferred embodiment of the present invention.

FIG. 5 is a graphs showing a change in a SRM torque according to an angle of the switched reluctance motor according to the prior art and the preferred embodiment of the present invention.

Figure 6:
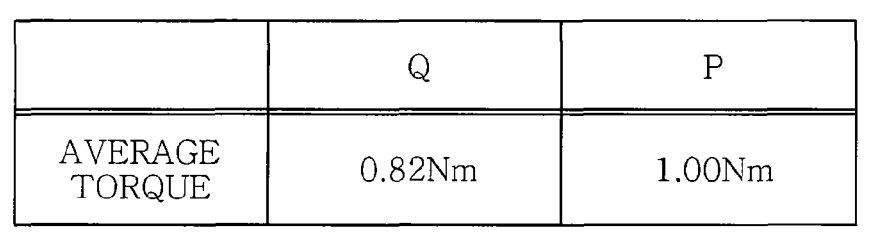

FIG. 6 is shows the average torque of the switched reluctance motor according to the prior art and the average torque of the switched reluctance motor according to the preferred embodiment of the present invention.

As shown in FIG. 1, the switched reluctance motor 100 according to the preferred embodiment of the present invention includes a stator 110 provided at an edge thereof and a rotor 120 provided at the center of the stator 110 and rotating around a shaft.

The switched reluctance motor 100 according to the preferred embodiment of the present invention is a motor in which both of the stator 110 and the rotor 120 have a magnetic structure, which is a salient pole, the stator 110 has a concentrated type coil wound therearound, and the rotor 120 is configured only of an iron core without any type of excitation device (a winding, a permanent magnet, or the like), such that a competitive cost is excellent.

Particularly, a speed changeable switched reluctance motor 100 stably generates a continuous torque with the aid of a converter using a power semiconductor and a sensor sensing a position of a rotor and is easily controlled to be appropriate for performance required in each application.

Recently, in the case of various alternate current (AC) motors such as an induction motor, a permanent magnet synchronous motor, or the like and a brushless direct current (DC) motor, when a significant improvement in performance is required with the passage of time after design of one electromagnetic field structure is completed, the electromagnetic field structure should be redesigned as a new electromagnetic field structure. Otherwise, there is no way except for a simple design change replacing a high cost material such as steel, a permanent magnet, or the like, which is not an efficient design.

This phenomenon is also applied to a switched reluctance motor. The switched reluctance motor 100 according to the preferred embodiment of the present invention is a motor designed to flexibly cope with a situation in which a significant improvement in performance is required with the passage of time after design of one electromagnetic field structure is completed.

As shown in FIG. 1, the switched reluctance motor 100 according to the preferred embodiment of the present invention is characterized in that a magnet 112 is inserted between segments A including each at least one teeth 111 to electromagnetically separate the segments A from each other, such that a size of the magnet 112 may be maximized.

When the magnet 112 is inserted into a common pole of a stator core 113, the stator core 113 has a separated structure in view of a magnetic circuit. According to the prior art, the stator core 113 has been separated due to an insertion portion of the magnet 112. According to the preferred embodiment of the present invention, the magnet 112 is inserted into the stator core 113, thereby making it possible to increase output density.

In order to maximize a torque of the motor or improve torque density, it is required to maximize a size of the magnet 112. According to the preferred embodiment of the present invention, the magnet 112 is inserted between the segments A, thereby making it possible to maximize the size of the magnet 112.

In addition, the magnet 112 is inserted between the segments A, such that both sides of the stator core are separated from each other by the magnet 112. Even though both sides of the stator core are connected to each other, they are magnetically saturated, such that they do not have an effect on a magnetic flux contributing to a torque.

The stator 110 is a salient pole type stator of which a plurality of teeth 111 have a coil 114 intermittently wound therearound.

FIG. 2 is a cross-sectional view showing a direction in which a current flows in the switched reluctance motor 100 according to the preferred embodiment of the present invention. The current flows from an N pole of the magnet 112 to an S pole thereof (that is, in a B direction). Components of FIG. 2 are the same as those of FIG. 1. Therefore, a description thereof will be omitted.

FIG. 3 is an enlarged view of a shape after the magnet 112 of the switched reluctance motor 100 according to the preferred embodiment of the present invention is assembled to the stator core 113, and FIG. 4 is a view showing a shape in which the magnet 112 of the switched reluctance motor 100 according to the preferred embodiment of the present invention is mounted in the stator core 113.

As shown in FIG. 4, each of the magnets 112 of the switched reluctance motor 100 according to the preferred embodiment of the present invention is mounted between the teeth 111 having the coil 114 wound therearound, and the magnet 112 and a slit part 115 may have a predetermined interval therebetween.

If it is assumed that a length of the magnet 112 in a longitudinal direction thereof is T and an interval between the magnet 112 and the slit part 115 is t, t may be 0 or more to T/2 or less.

As t increases, a torque decreases. For example, if it is assumed that a torque is 100% when l=0, a torque is 90% when t=T/10, a torque is 40% when t=T/4, and a torque is 30% when t=T/2.

The torque is best when t is 0 in view of characteristics; however, it is preferable that t has a small value in view of manufacturing.

FIG. 5 is a graphs showing a change in a SRM torque according to an angle of the switched reluctance motor according to the prior art and the preferred embodiment of the present invention. Curve P indicates a graph showing a change in a torque according to an angle of the switched reluctance motor 100 according to the preferred embodiment of the present invention, and curve Q indicates a graph showing a change in a torque according to an angle of the switched reluctance motor 100 according to the prior art.

FIG. 6 shows the average torque of the switched reluctance motor according to the prior art and the average torque of the switched reluctance motor according to the preferred embodiment of the present invention. The average torque Q of the switched reluctance motor according to the prior art is 0.82 Nm. On the other hand, the average torque P of the switched reluctance motor according to the preferred embodiment of the present invention is 1.00 Nm.

As shown in FIG. 6, the average torque of the switched reluctance motor 100 according to the preferred embodiment of the present invention is higher than that of the switched reluctance motor according to the prior art by 20% or more.

The switched reluctance motor 100 according to the preferred embodiment of the present invention described above has a structure capable of increasing a volume of the magnet 112 in order to maximize a magnetic flux effect of the magnet 112. In addition, since the volume of the magnet 112 is increased, a ferrite magnet is used rather than a neodymium (Nd) magnet, thereby making it possible to reduce a material cost.

The switched reluctance motor 100 according to the preferred embodiment of the present invention having the above-mentioned structure includes a salient pole type rotor 120 not having a winding and a salient pole type stator 110 having a concentrated type coil wound therearound, has a free electromagnetic field structure in which the magnet 112 may be inserted into the stator 110 or may not be inserted thereinto, and the stator core 113 is separated at the time of insertion of the magnet 112 into the stator 110.

In addition, the switched reluctance motor 100 according to the preferred embodiment of the present invention has a structure in which it may freely change the size, the grade, the position, the number, or the like, of inserted magnets 112 to be appropriate for the required performance.

Further, two-phase or more may always be implemented regardless of a state, only the magnet 112 is added, thereby making it possible to easily promote improvement in performance such as torque density, efficiency, or the like.

Furthermore, the switched reluctance motor 100 according to the preferred embodiment of the present invention has a free structure in which a punch for slot of a permanent magnet is extracted from a blanking mold and a stator iron pin is manufactured as needed, thereby making it possible to reduce a cost.

The magnet 112 is inserted, such that alternation of a magnetic flux is always prevented in the stator 110 regardless of a state, thereby making it possible to reduce core loss.

Although the preferred embodiments of the present invention have been disclosed for illustrative purposes, they are for specifically explaining the present invention and thus a switched reluctance motor according to the present invention is not limited thereto, but those skilled in the art will appreciate that various modifications, additions and substitutions are possible, without departing from the scope and spirit of the invention as disclosed in the accompanying claims.

Accordingly, any and all modifications, variations or equivalent arrangements should be considered to be within the scope of the invention, and the detailed scope of the invention will be disclosed by the accompanying claims.

What is claimed is:

1. A switched reluctance motor comprising:
a salient pole type stator that includes a plurality of teeth having a coil wound therearound and a magnet mounted between the teeth; and
a salient pole type rotor that is inserted into a central portion of the stator and rotates,
wherein:
the magnet is mounted between the teeth having the coil wound therearound;
the stator includes a slit part formed at a central portion of the teeth having the magnet mounted therebetween and having a space, and the magnet is disposed to be spaced apart from the slit part formed in the stator; and
when it is assumed that a length of the magnet in a longitudinal direction thereof is T and an interval between the magnet and the slit part is t, t is 0 or more to T/2 or less.

2. The switched reluctance motor as set forth in claim 1, wherein a portion of the stator in which the magnet is received and the slit part are disposed in a radial direction of the rotor.

3. The switched reluctance motor as set forth in claim 1, wherein the magnet is a ferrite magnet.

* * * * *